(12) United States Patent  (10) Patent No.: US 8,256,818 B1
Tovani  (45) Date of Patent: Sep. 4, 2012

(54) VEHICLE TABLE SYSTEM

(76) Inventor: Ernest Peter Tovani, Englewood, CO (US)

( * ) Notice: Subject to any disclaimer, the term of this patent is extended or adjusted under 35 U.S.C. 154(b) by 102 days.

(21) Appl. No.: 12/868,227

(22) Filed: Aug. 25, 2010

Related U.S. Application Data

(62) Division of application No. 11/548,246, filed on Oct. 10, 2006, now abandoned.

(51) Int. Cl.
*B60P 3/14* (2006.01)
(52) U.S. Cl. .................................................. 296/26.08
(58) Field of Classification Search ................... 296/163, 296/156, 159, 26.01, 26.08, 26.09, 26.1, 296/26.11
See application file for complete search history.

(56) References Cited

U.S. PATENT DOCUMENTS

| | | | |
|---|---|---|---|
| 2,246,813 A * | 6/1941 | Preston ....................... | 296/26.09 |
| 2,249,845 A | 7/1941 | Mitchell | |
| 2,471,730 A | 5/1949 | Doerr | |
| 2,545,269 A | 3/1951 | Ford | |
| 2,867,471 A | 1/1959 | Coon, Jr. | |
| 3,333,594 A * | 8/1967 | Moss ........................ | 135/88.14 |
| 3,394,666 A | 7/1968 | Pearlman | |
| 3,410,598 A * | 11/1968 | Davis et al. ................... | 296/176 |
| 4,089,554 A * | 5/1978 | Myers .......................... | 296/37.1 |
| 4,236,461 A | 12/1980 | Barksdale | |
| 4,375,306 A * | 3/1983 | Linder ....................... | 312/249.9 |
| 4,452,151 A | 6/1984 | Jarrard | |
| 4,455,948 A | 6/1984 | Torres | |
| 4,544,195 A | 10/1985 | Gunn | |
| 5,136,953 A | 8/1992 | Schmidt | |
| 5,143,417 A | 9/1992 | Philley et al. | |
| 5,312,149 A | 5/1994 | Boone | |
| 5,358,298 A | 10/1994 | Fate | |
| 5,479,866 A | 1/1996 | Rae | |
| 5,575,521 A | 11/1996 | Speis | |
| 5,582,456 A * | 12/1996 | Hammond ..................... | 296/163 |
| 5,660,425 A * | 8/1997 | Weber .......................... | 296/163 |
| 5,730,066 A | 3/1998 | Auten et al. | |
| 5,771,815 A | 6/1998 | Leftwich | |
| 5,820,189 A | 10/1998 | Tew | |
| 5,823,595 A * | 10/1998 | Tronco ....................... | 296/26.03 |
| 5,934,726 A | 8/1999 | Bossett | |
| 6,045,172 A | 4/2000 | Thomas et al. | |
| 6,145,447 A | 11/2000 | Henderson | |
| 6,161,486 A | 12/2000 | Boots | |
| 6,179,367 B1 * | 1/2001 | Bowen .......................... | 296/161 |
| 6,193,294 B1 | 2/2001 | Disner et al. | |
| 6,250,702 B1 | 6/2001 | Eipper | |

(Continued)

FOREIGN PATENT DOCUMENTS

JP 05319164 12/1993

*Primary Examiner* — H Gutman
(74) *Attorney, Agent, or Firm* — Bryan Cave LLP

(57) ABSTRACT

An embodiment of a vehicle mounted table system comprises hardware adapted to attach to a cargo area of a vehicle by way of one or more coupling mechanisms. The embodiment has a slider assembly adapted to slide relative to the hardware whereby the slider assembly can be slid at least partially out of a tailgate of the vehicle while the hardware remains attached to the vehicle. Operatively coupled to the slider assembly is one or more platforms, the platforms folding out of the vehicle through a hinge-turntable assembly. The embodiment also includes a canopy assembly having a flexible covering and one or more associated canopy supports, the one or more canopy supports adapted for attachment to the table structure when the tailgating assembly is fully deployed.

4 Claims, 18 Drawing Sheets

U.S. PATENT DOCUMENTS

| | | |
|---|---|---|
| 6,314,891 B1 | 11/2001 | Larson |
| 6,412,424 B1 | 7/2002 | Dirks |
| 6,431,629 B1 | 8/2002 | Emery |
| 6,467,417 B1 | 10/2002 | Guyot et al. |
| 6,739,269 B1 * | 5/2004 | Benton .......................... 108/44 |
| 6,811,207 B2 | 11/2004 | Dalpizzol et al. |
| 6,871,896 B1 * | 3/2005 | Owen ........................ 296/26.11 |
| 6,929,302 B1 * | 8/2005 | Demick et al. ............. 296/26.01 |
| 7,377,569 B2 | 5/2008 | Taylor et al. |
| 7,628,439 B1 * | 12/2009 | Strong ....................... 296/26.03 |
| 2002/0078861 A1 | 6/2002 | Davis |
| 2003/0057244 A1 | 3/2003 | Dorety |
| 2003/0075943 A1 | 4/2003 | Kirchhoff |
| 2004/0084072 A1 | 5/2004 | Tien |
| 2005/0092799 A1 | 5/2005 | Morris |

* cited by examiner

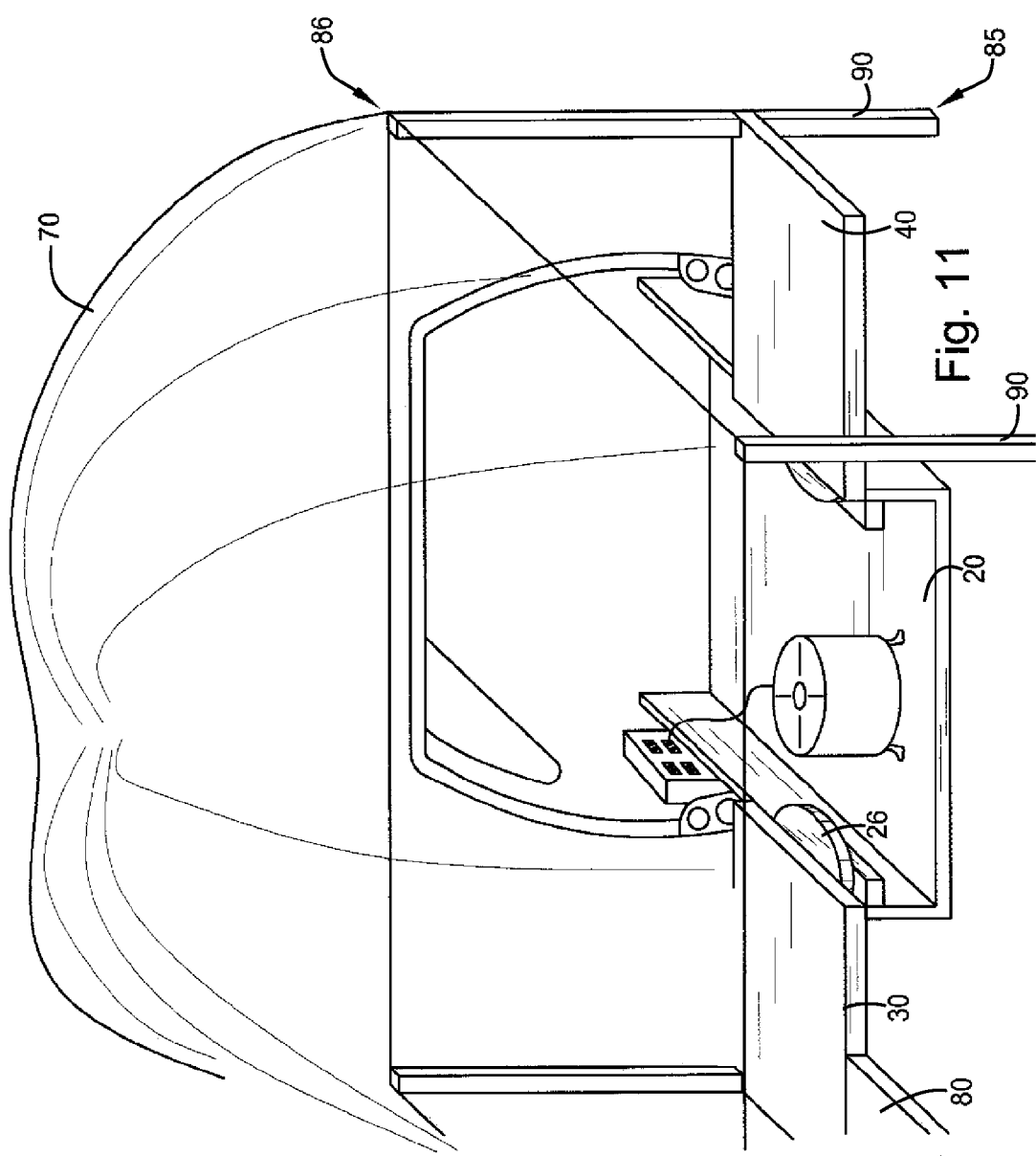

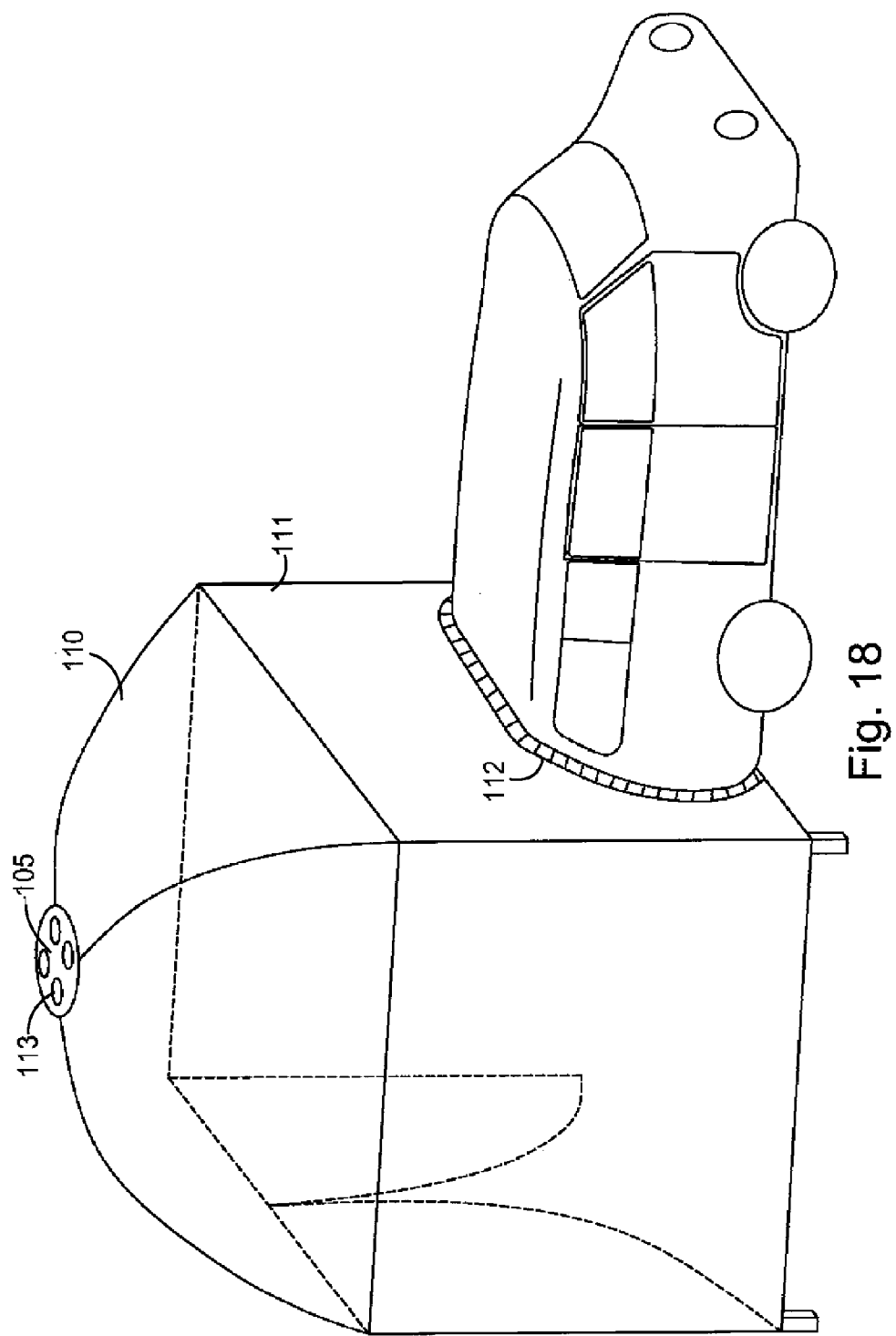

1

VEHICLE TABLE SYSTEM

CROSS REFERENCE APPLICATIONS

This application is a divisional of U.S. patent application Ser. No. 11/548,246 filed Oct. 10, 2006 now abandoned.

FIELD OF INVENTION

The invention generally relates to expandable vehicle table systems.

BACKGROUND OF THE INVENTION

Extendable tables are generally known in the industry and are generally adapted for use with a vehicle. Expandable tent systems are also generally known in the industry and are adapted for use with a vehicle. However, these prior art systems are adapted to be used independently of each other. For example, a collapsible tent system such as the system described in U.S. Pat. No. 3,333,594 ('594) is comprised of a frame which may be coupled to the vehicle, and a tent surface which is coupled to the frame. The device described in the '594 patent is adapted to be used as a shelter for camping or other similar activities. Likewise, the expandable table system disclosed in U.S. Pat. No. 2,249,845 ('845) is a system coupled to, and extendable from, the vehicle via a set of rails. The '845 system is adapted to be used as a picnic-table type device.

Although both references, among others, disclose various devices extendable from the vehicle, these devices and other similar systems are not readily adaptable for use outside of specific camping or picnicking uses, respectively. That is, a picknicker would be required to set up a separate canopy device if lie or she implemented a prior art expandable table system. Likewise other devices disclosed for use in a tailgating capacity, such as the device disclosed in U.S. Pat. No. 4,452,151 ('151), are similar to the picnicking devices, yet none of these devices disclose a tailgate system that extendably couples to the vehicle while also having a canopy and being removable from the vehicle after each use with minimal effort.

In today's society, tailgating at sporting events is an activity associated with sporting events that provides entertainment value unto itself, with many persons solely attending tailgating events with also including a visit to the actual game. A typical tailgating activity is to provide a smorgasbord for the tailgate attendees, often including food prepared from an adjacent grill. In many circumstances, with a large group of attendees present, it may be difficult to provide each attendee with food prior to the start of the sporting event without a large area to access the food. Additionally, since many sporting events occur whether or not there is inclement weather, oftentimes it may be raining or snowing during a tailgate session. Therefore, it is incumbent upon many tailgaters to provide a shelter for tailgate attendees. Overall, it would be highly desirable to have a system which easily attaches to a vehicle which is capable of extending from the vehicle and incorporates both a table and canopy system, among other features.

SUMMARY OF THE DRAWINGS

FIG. 11 is an isometric view of the driver-side and passenger-side platforms, a portion of the extension platform, the slider assembly, a plurality of legs and a transparent canopy assembly covering of one embodiment of the invention.

FIG. 18 is an isometric view of a vehicle and a vehicle table system having a canopy assembly and coupled sides of one embodiment of the invention.

DETAILED DESCRIPTION

Figure 1:
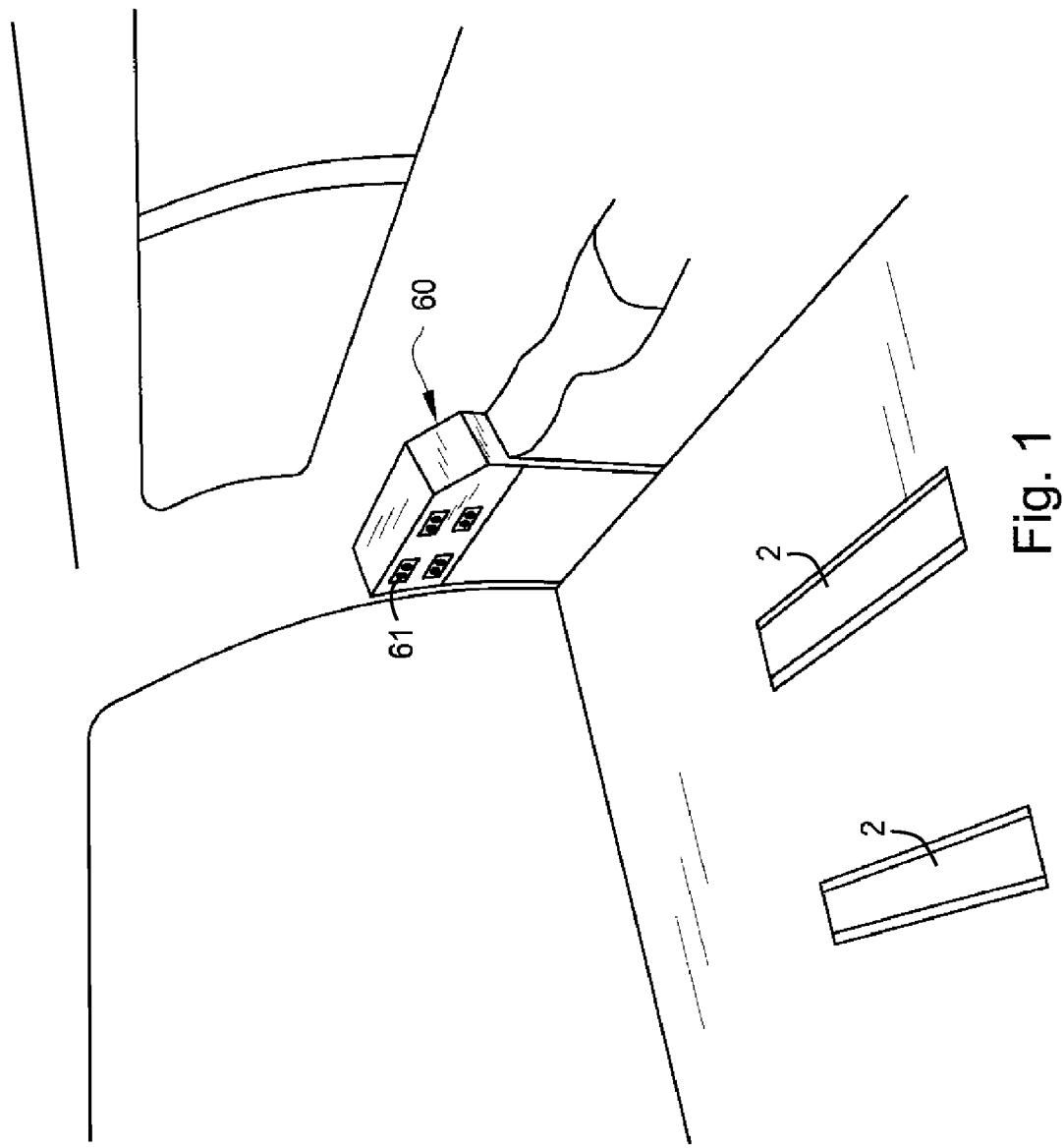
FIG. 1 is an isometric view of the rear of a minivan showing the rear seat tracks in one embodiment of the invention.

One embodiment of the invention is comprised of a driver-side platform, a slider assembly, and a turntable. The slider assembly may have a sliding piece and a rail. One embodiment is adapted to couple to a vehicle. In one vehicle embodiment, the rail is adapted to fit into the rear of a minivan. The rail may be adapted to couple to the rear seat track, such as by decoupling from the rear minivan seat the rear seat track bracket and subsequently coupling the rail to the bracket.

One embodiment may also include a frame. The frame may couple to a vehicle, and in one embodiment, the frame couples to a minivan's rear seat tracks, possibly through the rear seat track bracket upon detaching the rear seat from the track bracket. In such an embodiment, the sliding mechanism may be coupled to the frame. An embodiment having a sliding mechanism may couple the sliding mechanism to the top of the frame so that the table may slide.

The sliding mechanism, or slider, is typically adapted to slide the table towards the rear of the vehicle. For example, in a system where a frame is fixedly attached to the rear seat tracks, and a rail is coupled to the top of the frame, the driver-side table is typically slidably placed within the rail. The rail is typically comprised of a device which locks the table in a position along the rail. In one embodiment, the locking device is a device such as, but not limited to, a pin-bore system wherein the rail has a plurality of bores along an edge, the table is also comprised of a bore, and a pin is inserted through the table bore and at least one of the rail bores in order to lock the table in a position along the rail. The locking device may be a different device as well. When the sliding mechanism is a rail, the table may be adapted to couple directly to the rail and slide, or the table may couple to a device which is adapted to slide within the rail. In one embodiment, the rail is placed on top of the frame in a position such that the width of the table is in a substantially vertical orthogonal position as relative to the sliding direction.

In either embodiment, upon the table being slidably connected to the sliding mechanism and the slider locking device is released or removed from the table, the table is slid along the slider. In a vehicle embodiment, this is typically towards the rear of the vehicle and rear bumper. The sliding mechanism is adapted to allow the forward edge of the table to clear the rear of the vehicle.

One embodiment uses a Joey Bed Jr. SUV/Mini-Van, manufactured by Joey Bed, Inc. of Cottage Grove, Oreg. as the sliding mechanism. In such an embodiment, the Joey Bed is coupled to the frame and at least a portion of the bed is adapted to slide out of the rear of the vehicle. The bed typically has (i) a base and (ii) rails on both the driver side and passenger side of the base.

In one embodiment, the driver-side table is coupled to a turntable. The turntable, in turn, is coupled to a slider which is adapted to lit into the rails of the Joey Bed. The slider is also adapted to extend beyond the rearward edge of the bed, thereby allowing the forward edge of the table to clear the rear of the vehicle.

Upon clearing the rear edge of the vehicle, the turntable is used. At this point the turntable and a hinge rotate the table about 90 degrees, typically to a position such that the forward edge of the table is now the driver-side edge of the table. The rotation enables a lengthwise edge of the table to rotate from a substantially parallel position relative to the sliding direction to a substantially horizontal orthogonal position relative to the sliding direction.

One embodiment is also comprised of a canopy. The canopy may be coupled to the at least one table. For example, the at least one table may be a driver-side table. The driver-side table may have at least one leg coupled to the table and the canopy may include a frame. The frame of the canopy and the leg may be coupled in a manner adapted to allow the canopy to expand.

When the driver-side table is in the substantially horizontal orthogonal position, in one embodiment the leg that is coupled to the table may be coupled to the table at a rear table corner. The leg may be adapted to rotate from a substantially horizontal lengthwise position to a substantially vertical lengthwise position. In one embodiment, the leg is a telescoping leg adapted to expand, expanding upwardly and downwardly while in the vertical lengthwise position. In other embodiments, the leg is not a telescoping leg, and a bottom leg portion and an upper leg portion may be coupled to a middle leg portion which is coupled to the table. The upper and lower leg portions may be coupled through a coupling mechanism such as, but not limited to, a pin-bore coupling mechanism. In one embodiment, the middle leg portion is coupled to the driver-side table through a pivoting bracket. With either the telescoping leg or the non-telescoping leg embodiment, the distal end of the bottom leg portion is adapted to be placed on the ground, providing support to the table through the bottom leg portion/middle leg portion coupling or the telescoping leg.

Likewise, the upper leg portion is coupled to the middle leg portion. Both the upper leg portion and the bottom leg portion are capable of being vertically adjustably coupled to the middle leg portion in one embodiment, to account for different required heights. In one embodiment, after the driver-side table is in the substantially horizontal orthogonal position, the coupled leg middle portion is rotated from a substantially horizontal position to a substantially vertical position and the upper and lower leg portions are expanded or coupled to the middle leg portion.

The upper leg portion in one embodiment is coupled to the canopy frame. The canopy frame may be detachably coupled to the upper leg portion in one embodiment. For example, the canopy frame may couple to a proximal end of the leg upper portion through a pin-bore coupling mechanism. In such an embodiment, the canopy frame is typically coupled to the upper leg portion prior to the upper leg portion expanding upward in the telescoping leg embodiment, or prior to the upper leg portion being coupled to the middle leg portion in the non-telescoping leg embodiment. In one embodiment, such as, but not limited to, the telescoping leg embodiment, the canopy frame is coupled to the proximal end of the upper leg portion such that when the leg is positioned in a substantially vertical manner and telescoped out, the canopy frame is adapted to pivot on the upper leg portion coupling.

In one embodiment, the canopy frame is a telescoping frame. The canopy frame is coupled to the leg in such a manner that when the canopy frame pivots on the upper leg portion, the canopy frame is adapted to telescopily expand. In one embodiment, the canopy frame is coupled to the canopy covering during expansion. Therefore, when the canopy frame expands, typically inwardly from the leg, the canopy covering expands, thereby covering at least a portion of the table and a socializing area.

Other sections of the canopy frame are typically coupled to other legs in a substantially similar manner. For example, in one embodiment, an expansion table is coupled to the driver-side table and the expansion table includes a leg which is coupled to a canopy frame section. In one embodiment, the expansion table has a first section and a second section, the first and second sections being coupled together with a hinge. The hinge allows the first and second sections to fold together such that they may be stored in the vehicle or other storage area in a substantially similar manner as the driver-side table. For example, in one embodiment, the extension table may have its own rail similar to the driver-side table rail, or the extension table may also be coupled to a sliding mechanism such as a "Joey Bed". During storage, the extension table may be coupled to the sliding mechanism such as a Joey Bed by either coupling the extension table to the driver-side table through a series of straps or through a clasping or snapping mechanism, or the extension table may couple directly to the sliding mechanism base through a slot.

An embodiment is contemplated where the extension table first section may also be coupled to the driver-side table through a hinge. In such an embodiment, the extension table unfolds from the driver-side table via the hinge and the extension table expands into a first and second section via the extension table hinge. Each table hinge is typically supported with at least one bracket. The extension table leg is typically coupled to a rear extension table corner opposite the driver-side table coupling. A canopy frame section may be coupled to the extension table leg in substantially the same manner as the canopy frame is coupled to the driver-side table leg. Upon pivoting and expanding the extension table leg in a manner substantially similar to the driver-side table leg, the canopy frame section and covering coupled to the expansion table leg expands in substantially the same manner as the canopy section coupled to the driver-side leg.

An embodiment may also be comprised of a passenger-side table. The passenger side table in one embodiment is substantially similar to the driver-side table in operation and design, having a turntable and coupled to a slider adapted to fit in a Joey Bed rail. However, the passenger side table folds towards the passenger side of the vehicle instead of the driver side of the vehicle. The passenger side table has a passenger-side leg and coupled canopy frame that operates substantially similar to the driver-side table leg and coupled canopy frame. The passenger-side table may have a coupled extension table and leg in one embodiment that is substantially to the driver-side extension table and leg.

An embodiment may also have a stand-alone leg. Typically used in an embodiment that does not have a passenger-side extension table, the stand-alone leg may be a telescoping leg or non telescoping leg that is substantially similar to the legs coupled to the other corners of the canopy. The stand-alone leg may also be used in an embodiment that does not have a driver-side extension table as well. Coupled to the distal end of the standalone leg and in one embodiment in at least one other leg, is at least one foot. One embodiment is comprised of a standalone leg with four feet. Each foot is coupled to the end of the leg with a hinge and a bracket which is adapted to keep the foot substantially perpendicular to the leg. Each foot is adapted to provide stability to the standalone leg.

Terminology:

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, tense or any singular or plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of phrases like "in one embodiment", "in an embodiment", or "in a variation" in various places in the specification are not necessarily all meant to refer to the same embodiment or variation.

The term "couple" or "coupled" as used in this specification and the appended claims refers to either an indirect or direct connection between the identified elements, components or objects. Often the manner of the coupling will be related specifically to the manner in which the two coupled elements interact.

The term "integrate" or "integrated" as used in this specification and the appended claims refers to a blending, uniting, or incorporation of the identified elements, components or objects into a unified whole.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

The term "composite", "composites" or any version thereof refers to a solid material which is composed of two or more substances having different physical characteristics and in which each substance retains its identity while contributing desirable properties to the whole.

The term "tailgate", "tailgating", "tailgate party", or any similar version refers to a picnic that is served from the tailgate of a vehicle, as before a sports event.

The term "telescoping" refers to two parts of a device which are coupled together lengthwise, with one part entering, sliding, or passing within another part like the cylindrical sections of a collapsible hand telescope.

The term "turntable", or any version thereof refers to a revolvable platform or disk, such as a lazy Susan.

First Embodiment of a Table System

As shown by FIGS. 1 through 15, an embodiment of a vehicle mounted table system 10 is shown. One embodiment is typically comprised of hardware 10, a slider assembly 20, a driver-side platform 30, a passenger-side platform 40, a cooling apparatus a power inverter 60, and a canopy assembly 70. One embodiment may not be comprised of all of these items, and may only be comprised of a portion of these items. However, no matter how many of these items an embodiment is comprised of, the system is adapted to allow a person to easily install and set up for a tailgate party or other vehicle-picnic event.

Figure 4:
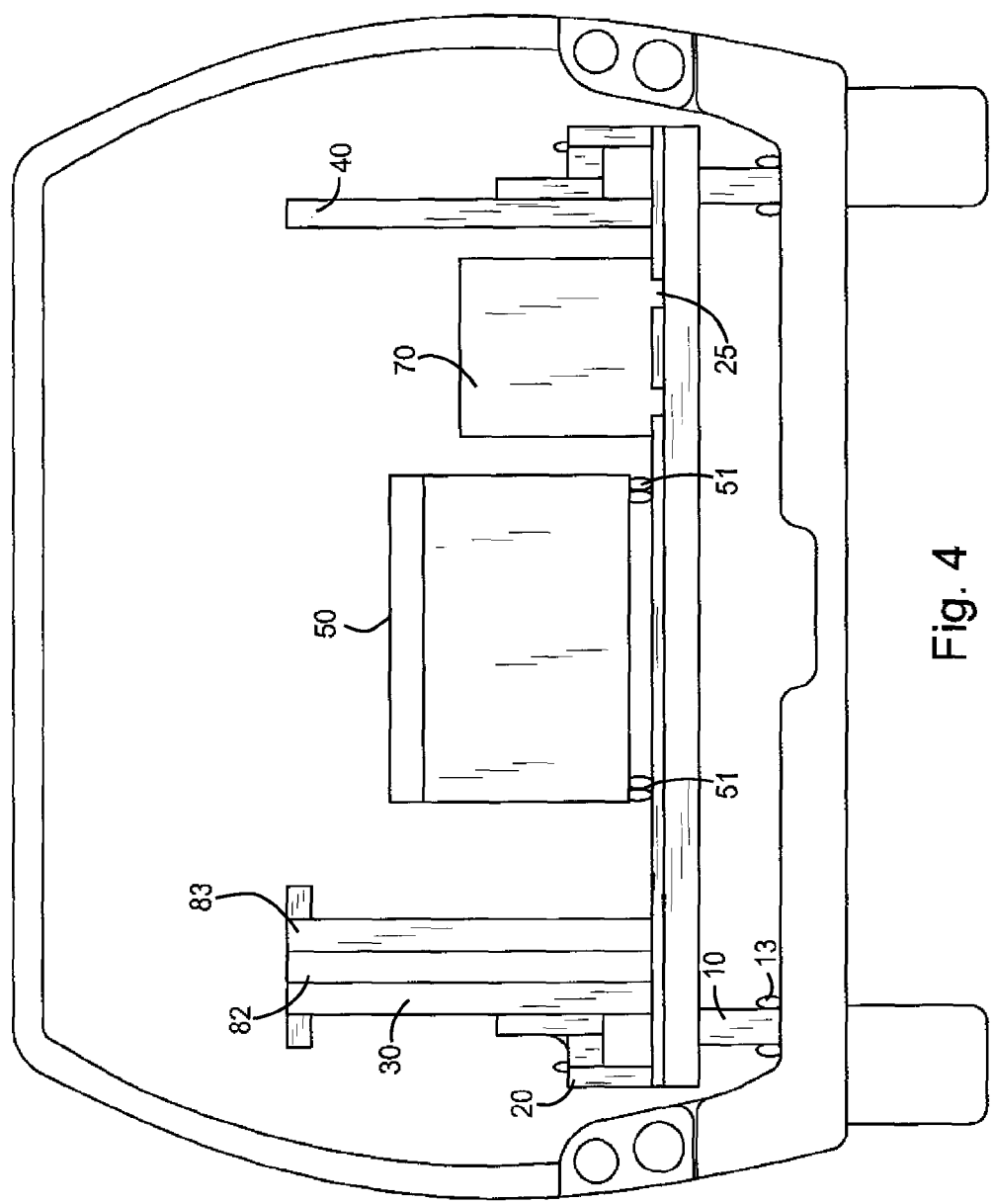
FIG. 4 is a rear view of a vehicle having a vehicle tailgate system loaded in a storage position in one embodiment of the invention.

In one embodiment, the system is adapted to be placed in the rear of a minivan, as best shown in FIG. 4. An embodiment is also adapted to be placed in the rear of an SUV, and one embodiment is adapted to be placed in the rear of a pick-up truck. There is one embodiment that is adapted to be placed in the trunk of a car and another embodiment that is adapted for use with an RV as well. Many times, the embodiment is adapted to couple to the cargo area of a vehicle.

Figure 2:
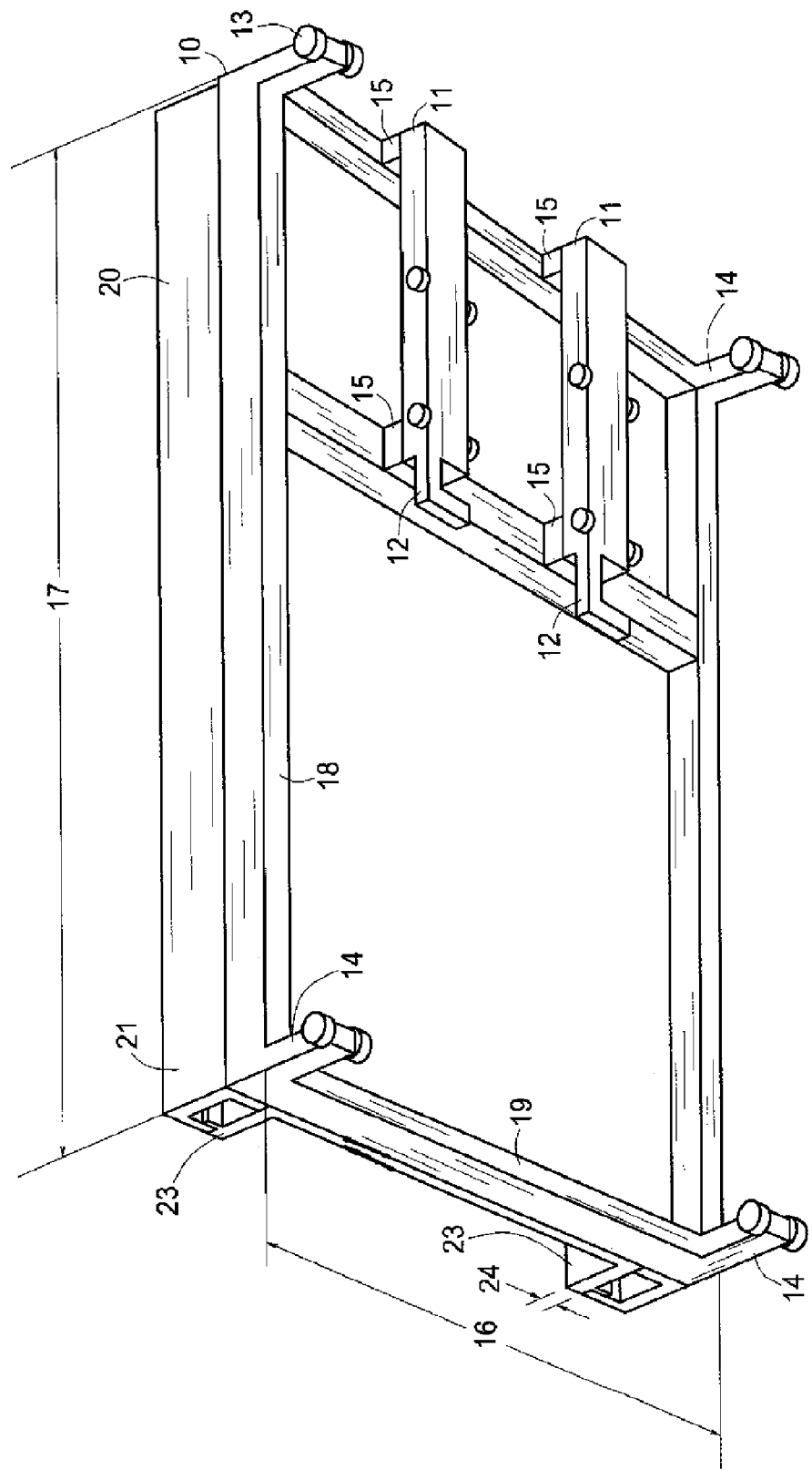
FIG. 2 is a bottom isometric view of the slider assembly, coupled hardware, and seat track coupling mechanisms of one embodiment of the invention.
Figure 3:
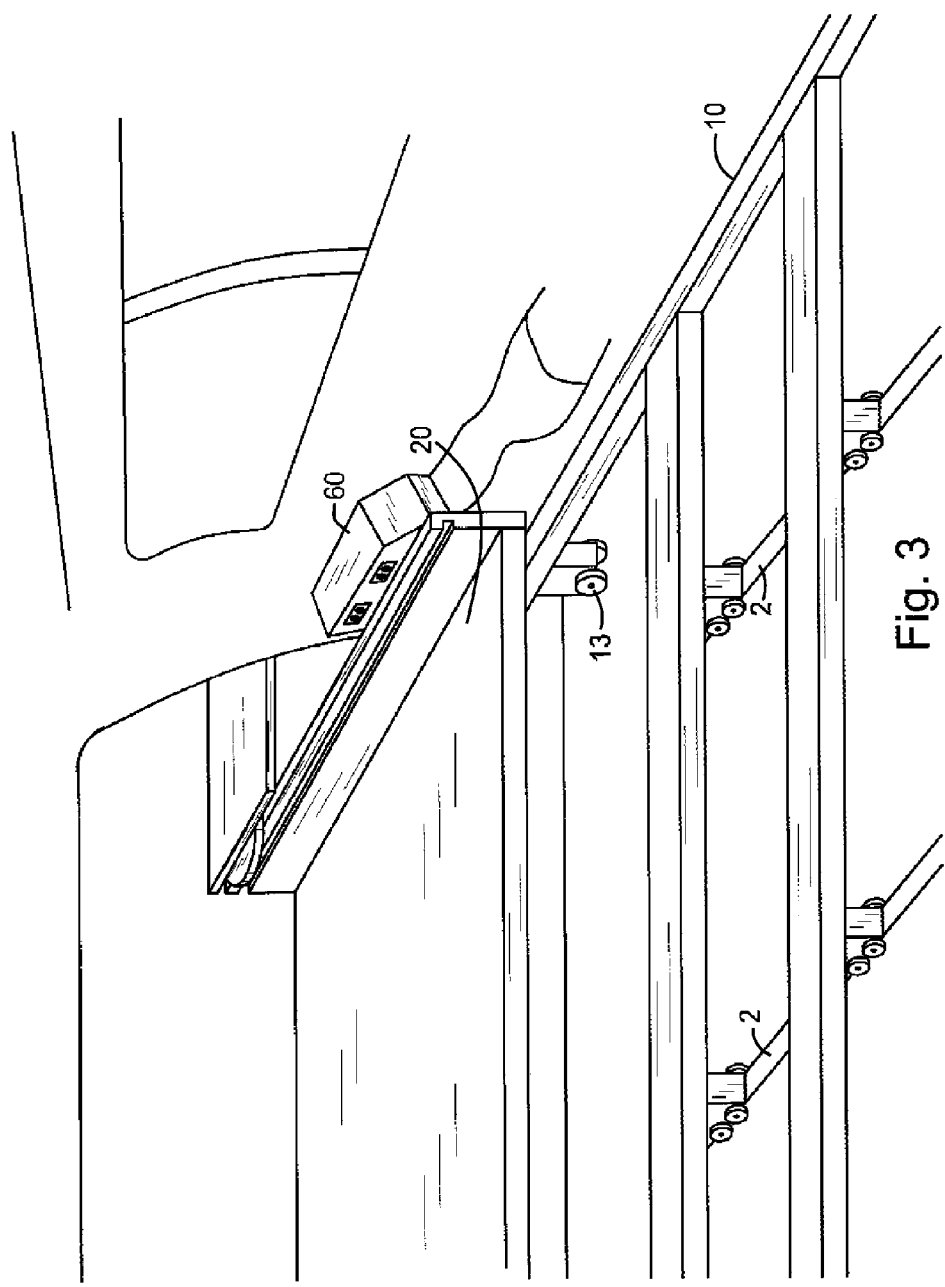
FIG. 3 is an isometric view of hardware and extended slider assembly and driver-side platform of one embodiment of the invention.

In an embodiment that is adapted to fit in the rear of a minivan, in one version of the embodiment that includes the hardware 10 and the slider assembly 20, as best shown in FIG. 3, the hardware is framework may be adapted to couple to the minivan's rear seat tracks 2 through one or more attachment brackets. One embodiment may be adapted to couple to seat tracks other than the rear seat tracks as well. To couple to the seat tracks so, the hardware may include attachment brackets which are seat-track coupling mechanisms 11, as best shown in FIG. 2, or the hardware may not be comprised of a seat-track coupling mechanism, but may be comprised of the seat-track bracket which is coupled the minivan's existing rear seat. The seat-track coupling mechanism may be a bracket and may be comprised of a handle 12 adapted to release the hardware from the seat-tracks upon disengagement. Disengagement may occur by twisting the handle.

The hardware 10 may include wheels 13, as best shown in FIGS. 2 and 3. The wheels are typically coupled to framework posts 14 and are adapted to allow a user to easily maneuver the system prior to installation and after removal of the system from the vehicle, by allowing the system to be rolled along the ground on the wheels. One embodiment includes a stacked vehicle coupling mechanism 11, as best shown in FIG. 2. Stacked coupling mechanisms typically include blocks 15 or other similar devices. The blocks may be adapted to enable the framework wheels to rest on the vehicle floor upon insertion of the coupling mechanism into the seat track 2. In a non-stacked framework, as best shown in FIG. 3, the wheels 13 may also rest on the ground. In both a stacked and non-stacked embodiment, the length of hardware posts 14 are typically less than 12 inches, with the posts being about 8 inches in one embodiment.

The hardware 10 may be constructed of a lightweight material such as a composite material. However, in one embodiment, the hardware is framework comprised of steel alloy. The framework may also be comprised of aluminum alloy or any other type of material that is adapted to support the system components upon storage of the components in the vehicle.

As the hardware 10 of one embodiment is adapted to fit in the back of a minivan, the width 16 of the hardware in an embodiment is wide enough to lit through the rear cargo hatch of a minivan. An embodiment is also adapted to lit into the hack of a SUV such as a Toyota Highlander, into a trunk of a car, and onto a pick-up truck bed as well, respectively. In these or other embodiments, the hardware 10 may not be framework hardware, but the hardware may be another device such as, but not limited to, a cable-ratchet system adapted to secure the table system within the vehicle.

The length 17 of the framework is such that the framework may fit between a van's rear door or hatchback and the third row of seats. In one embodiment, the framework is long enough to fit between the hatch and the van's second row of seats or between the hatch and the first row, or front seats. The framework generally takes up the entire width and length of the area that it fits into. In one embodiment the framework is comprised of at least one lengthwise beam 18 and one widthwise beam 19, although one embodiment's framework is comprised of two lengthwise beams and three widthwise beams, as best shown in FIG. 2.

The slider assembly 20 is adapted to move at least a portion of the system. In one embodiment, the slider assembly is generally the same length and width as the framework length 17 and width 16. However, one embodiment's slider assembly may be substantially smaller than the framework and one embodiment's storage platform may be substantially larger than the framework. At least a portion of the slider assembly is typically adapted to slide in and out of the vehicle such as an SUV, minivan, or trunk, or to slide on and off of the bed of a pick-up truck. One way that the slider assembly may be coupled to the framework is through a pair of rails 21, as best shown in FIG. 2. In one embodiment, the rails may enable a sliding piece 22 to slide in and out of a vehicle by rolling along the rails that are coupled to the framework.

One type of product which is adaptable for use as a slider assembly 20 is the Joey Bed Jr. SUV/Mini-Van, manufactured by Joey Bed, Inc. of Cottage Grove, Oreg. In one embodiment, the slider assembly is partially comprised of steel. However, other material types may be substituted. Additionally, there are typically sidewalk 23 on the sliding piece 22. The thickness 24 of a sidewall in one embodiment is 1 and ¼ inches. In one embodiment, the components of the vehicle tailgate system are coupled with the sidewalls to ensure that the components are not tossed around during movement of the vehicle. The sliding piece may be locked in position by a handle, such as, but not limited to, the handle locking mechanism included in the Joey Bed product. The sliding piece may lock into position using a different device such as, but not limited to, a pin-bore locking mechanism. With either locking device, or in other locking mechanisms, the sliding piece may be locked in multiple positions.

As previously stated, an embodiment is contemplated that is not comprised of framework. In such an embodiment, the slider assembly 20 is coupled directly to the vehicle with hardware 10. The slider assembly in such an embodiment may be adapted to slide in and out of a minivan, pick-up truck bed, SUV, or trunk.

As best shown in FIG. 4, one embodiment of a vehicle tailgate system is comprised of a driver-side platform 30, a passenger-side platform 40, and a cooling apparatus 50. Each platform typically has a flat surface. The platforms and cooling apparatus are typically coupled to the sliding piece in one embodiment. The items may be coupled to the sliding piece through a mechanism such as, but not limited to, a snapping mechanism or a latching mechanism wherein the items snap into, or are latched into, notches 25 within the sliding piece, as best shown in FIG. 4. The items may also be coupled to the sliding piece in a different manner. For example, the items may simply be strapped onto the sliding piece with straps or cables. An embodiment is contemplated that is not comprised of a framework, or is comprised of a much smaller framework than the framework shown in FIGS. 2 and 3. Additionally, one embodiment may be comprised of a sliding device which has at least one rail and coupled slider that enable the platform to slide out of a vehicle, while being operatively coupled to the hardware 10.

Figure 5:
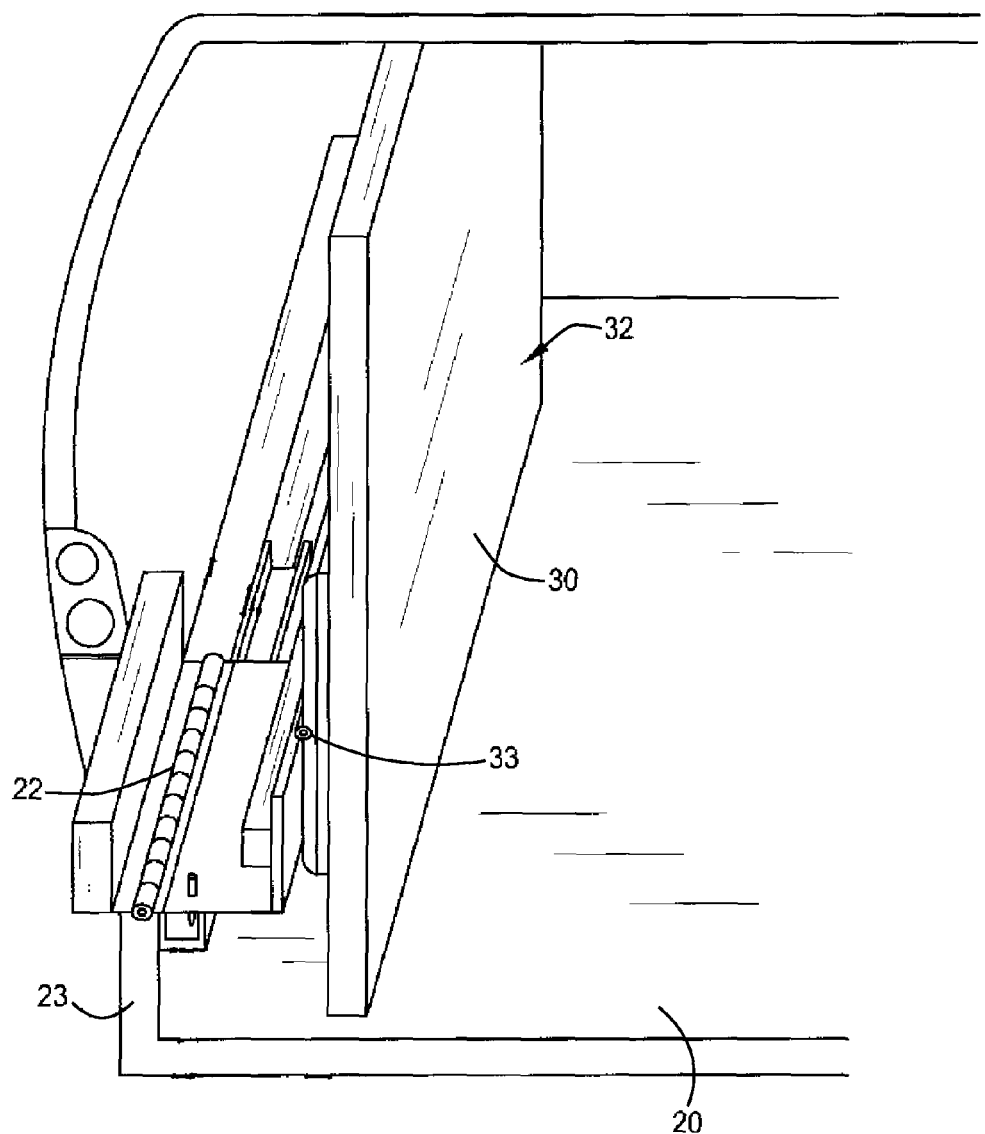
FIG. 5 is an isometric top side view of a driver-side platform, slider assembly, sliding piece, and turntable in a vertical orthogonal position in one embodiment of the invention.
Figure 6:
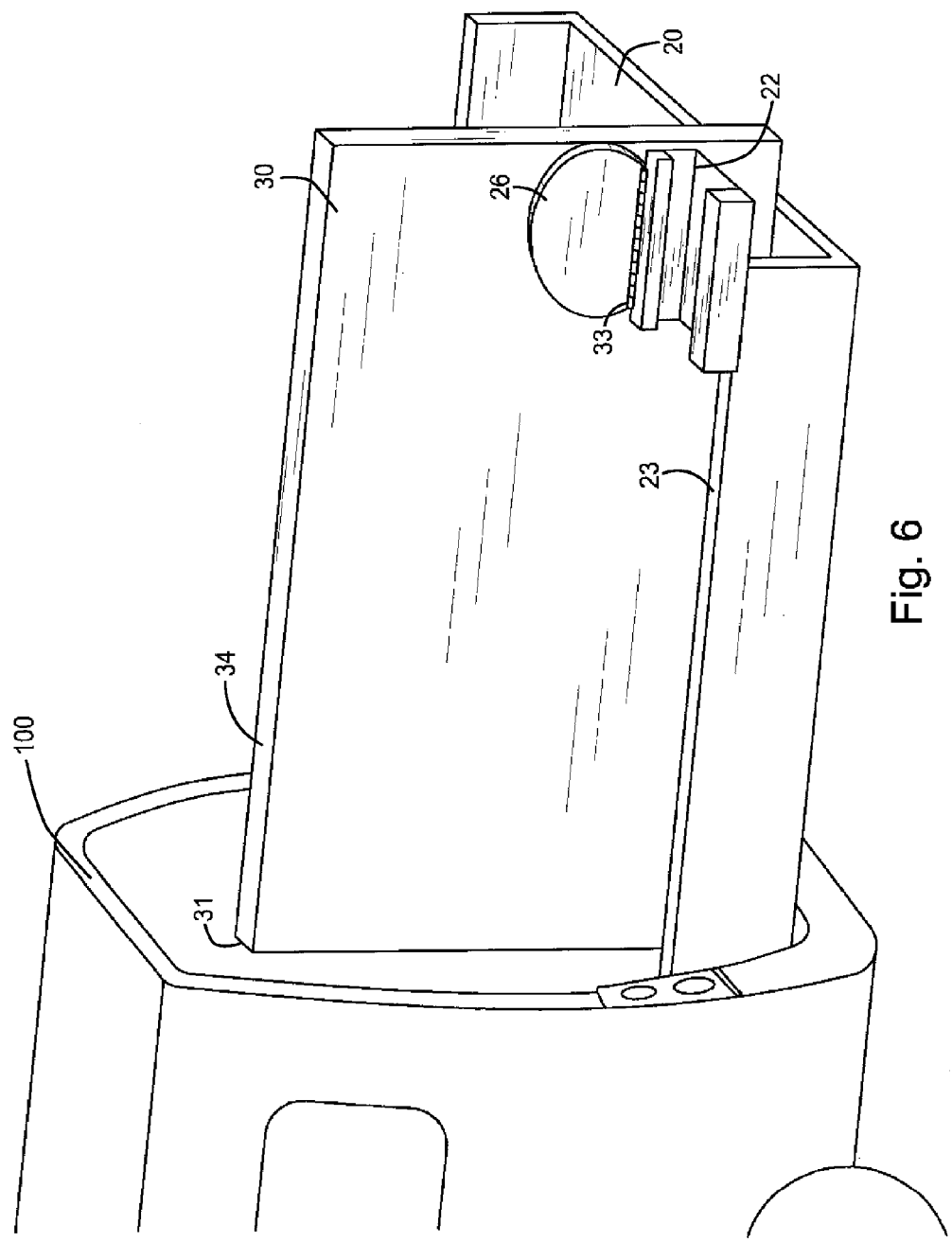
FIG. 6 is a side isometric view of a vertical orthogonal position of a driver-side platform, slider assembly, and turntable of one embodiment of the invention.

The slider assembly 20 is typically coupled to a driver-side platform 30 through a driver-side sliding piece 22, as best shown in FIG. 5. The sliding piece is typically coupled with a slider assembly raid 23. The slider assembly is adapted to allow a portion of the sliding piece and a coupled driver-side turntable 26 and platform 30 to slide beyond the rearward edge 27 of the slider assembly 20, as best shown in FIG. 6. Additionally, the sliding piece typically places the forward edge 31 of the platform, when the platform is in the storage position as shown in FIG. 6, in a position typically outside rear end 100 of the vehicle. In one embodiment, this position is necessary in order to rotate the table from the FIG. 6 storage position to the FIG. 8 tailgate position.

One embodiment may use a slider assembly 20 and sliding piece 22 that are adapted to provide motion in one dimension. One sliding piece includes a rail. A sliding piece may also have a linear motion hearing. Other type of sliding pieces and slider assemblies may be used in embodiments as well. When a linear motion bearing is employed, slider assembly typically includes a sleeve-like outer ring and several rows of balls retained by cages. A typical embodiment's slider assembly and sliding piece features smooth motion, low friction, high rigidity, and long life. Additionally, an embodiment's slider assembly and sliding piece are economical to install, easy to maintain, and easy to replace. One embodiment's linear motion bearing does not use balls, but uses polymeric bearings housed in a hard anodized extruded aluminum rail.

In any event, in one embodiment, upon installing the slider assembly 20 and coupled hardware 10 into the minivan seat tracks 2, the hardware is typically locked into a first position by using the handle 12. The first position is best represented by FIG. 4. The slider assembly is slid into a second position, as best shown in FIG. 6. As FIG. 6 shows, the second position includes extending at least a portion of the sliding piece 22 beyond the rear edge 27 of the slider assembly. When the slider assembly is in the second position, the turntable 26 is rotated. The turntable generally rotates in a plane substantially parallel to the flat surface of the platform that the turntable is operatively coupled to.

Figure 7:
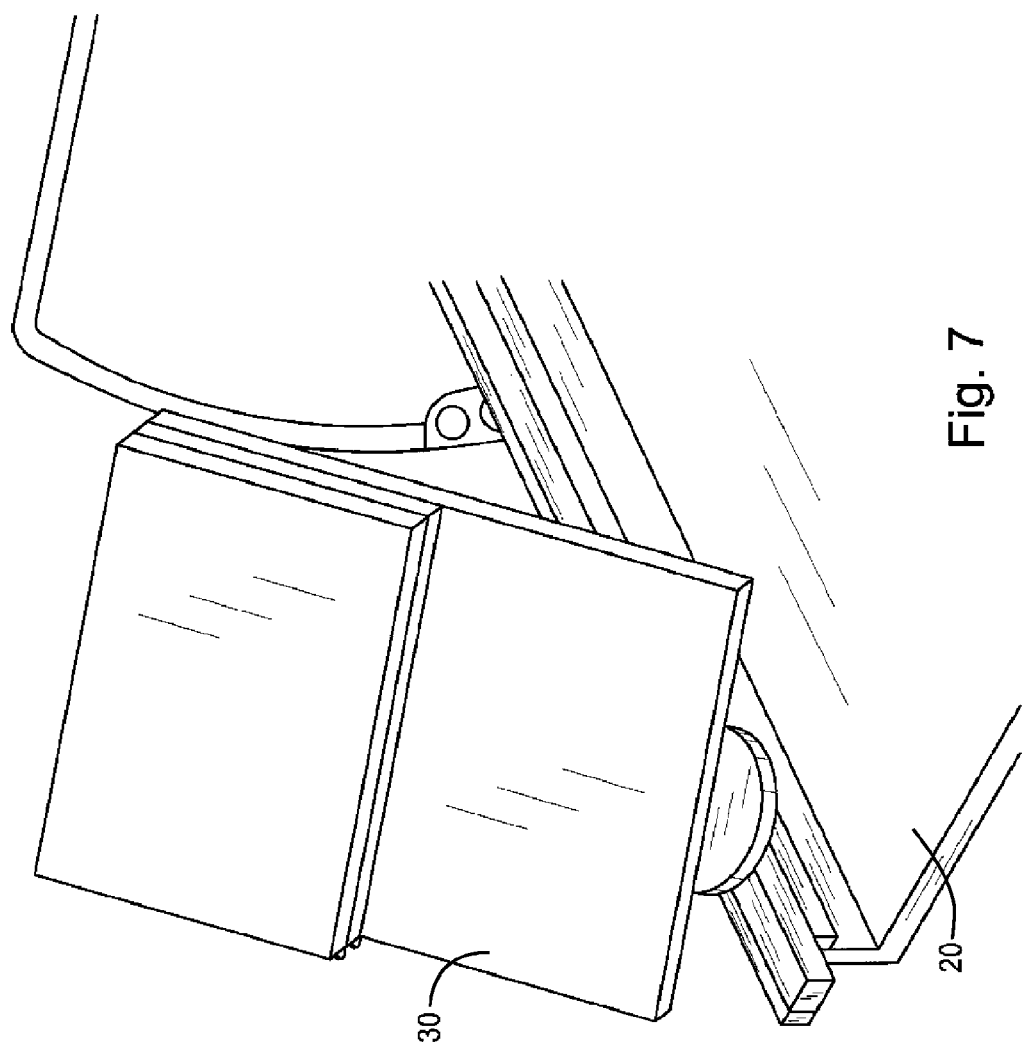
FIG. 7 is an isometric view of a driver-side platform, coupled extension platform, slider and turntable highlighting the rotation of the driver-side and extension platforms from a generally vertical orthogonal position to a generally horizontal orthogonal position.
Figure 8:
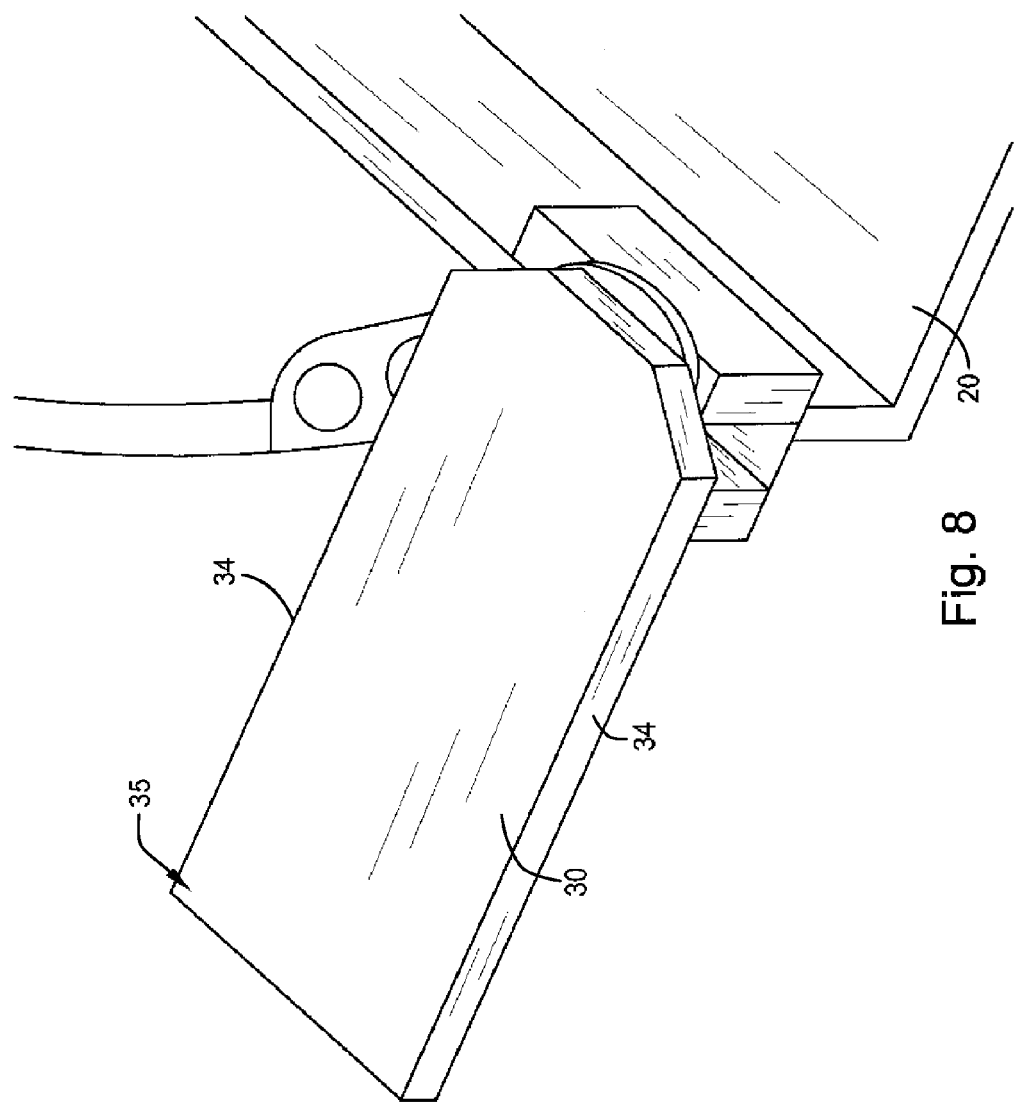
FIG. 8 is an isometric view of the driver-side platform, slider assembly, sliding piece, and turntable in a generally horizontal orthogonal position.

For example, as best shown in FIG. 5, the turntable 26 rotates about a plane substantially parallel to the driver-side platform flat surface 32. Rotation of the turntable from the position shown in FIG. 6 to the position shown in FIG. 8 also includes use of a sliding piece hinge 33 adapted to pivot the platform from a substantially vertical orthogonal position relative to the sliding piece 22 sliding direction, as best shown in FIG. 6, to a substantially horizontal orthogonal position relative to the sliding piece sliding direction, as best shown in FIG. 8. The rotational and hinged movement of the platform is best shown in FIG. 7. In one embodiment, the turntable 26 rotates the platform from a position where a lengthwise edge 34 of the platform is generally parallel to a lengthwise edge of the vehicle, as best shown in FIGS. 5 and 6, to the FIG. 8 position where the lengthwise edge of the table is generally parallel to a widthwise edge of the vehicle.

Figure 9:
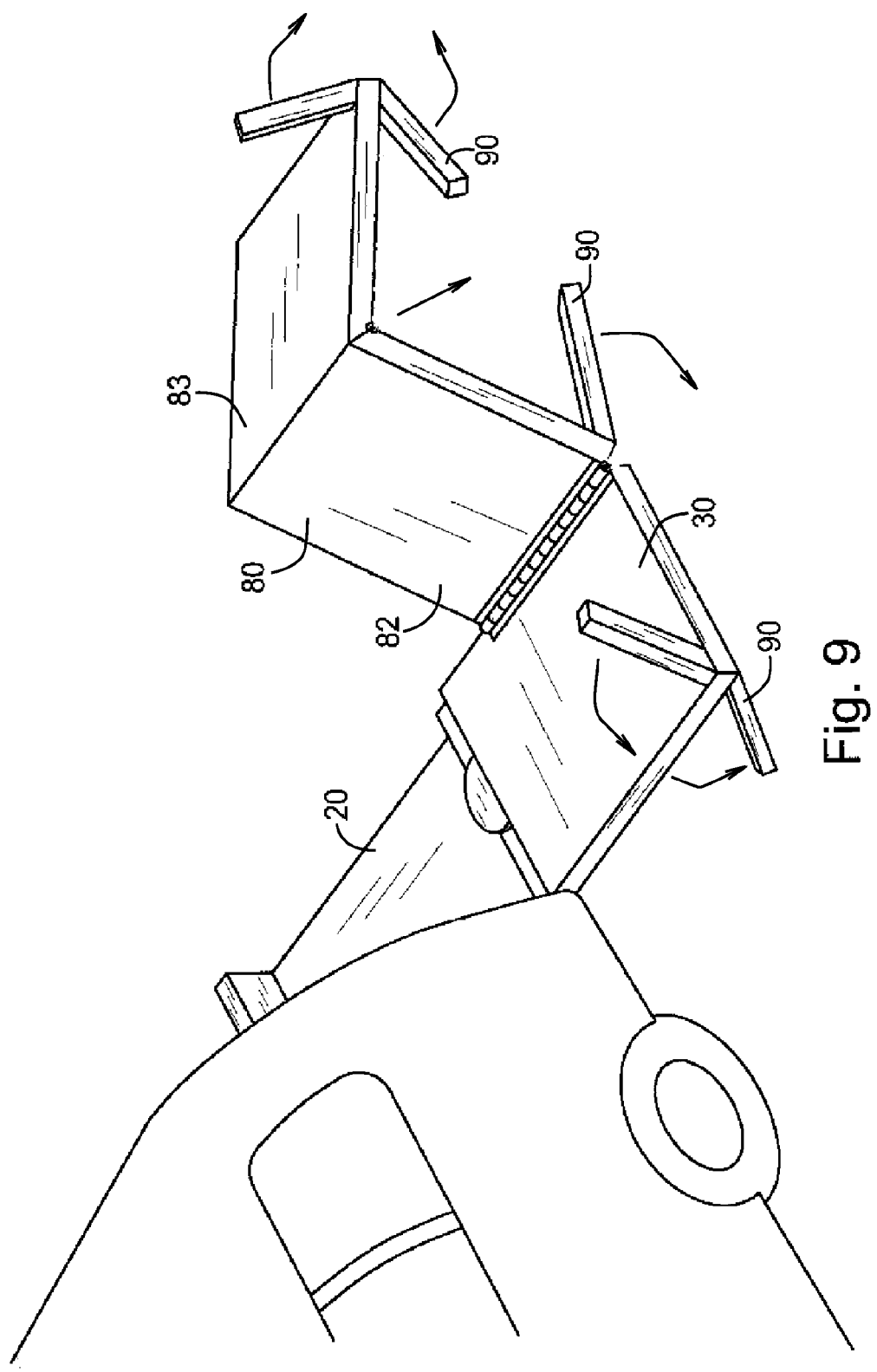
FIG. 9 is an isometric view of the driver-side platform, extension platform, and legs of one embodiment of the invention.
Figure 12:
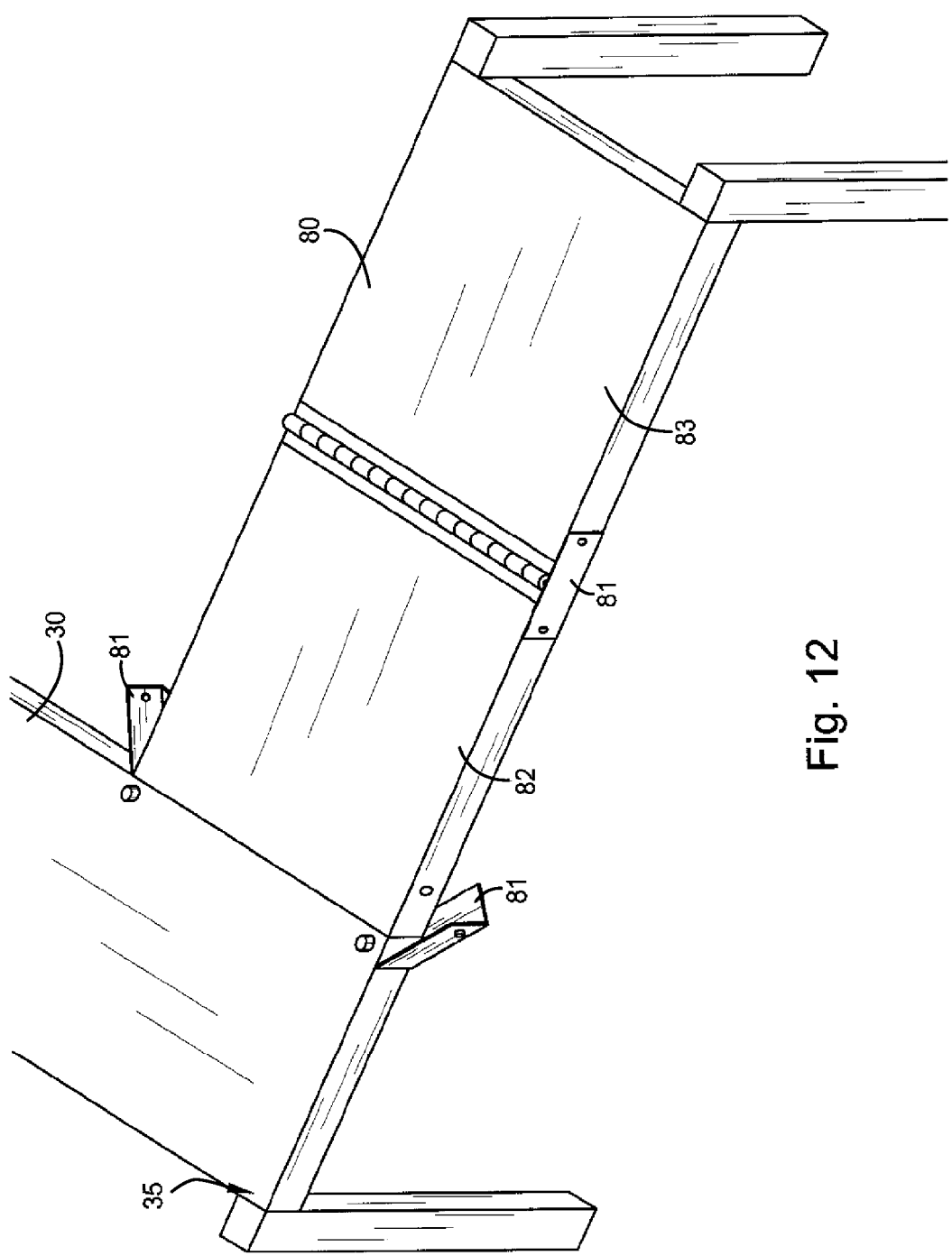
FIG. 12 is an isometric view of the extension platform and a portion of the driver-side platform of one embodiment of the current invention.

When the driver-side platform 30 is in the substantially horizontal orthogonal position, as best shown in FIG. 8, an extension platform 80 may couple to the driver-side platform. The extension platform may couple to the driver-side platform through a pair of brackets 81, as best shown in FIG. 12. In one embodiment, the extension platform may couple to the driver-side platform with a hinge, as best shown in FIG. 9.

The extension platform 80 is comprised of a first section 82 and a second section 83 in one embodiment. An embodiment may only be comprised of a first section, and the length or a first section only embodiment may be longer than the first section of a first and second section embodiment. When an embodiment's extension table is comprised of a first and second section, the sections are typically coupled together with a hinge, as best shown in 12. In one embodiment, at least one bracket 81 is coupled to the first and second sections in order to provide support to the hinged portion of the extension platform and help lock the extension platform in the open position as shown by FIG. 12. The bracket may be coupled to the second section through a substantially nonremovable pin. The first section may then be coupled to the bracket with a removable pin.

Figures 10A, 10B:
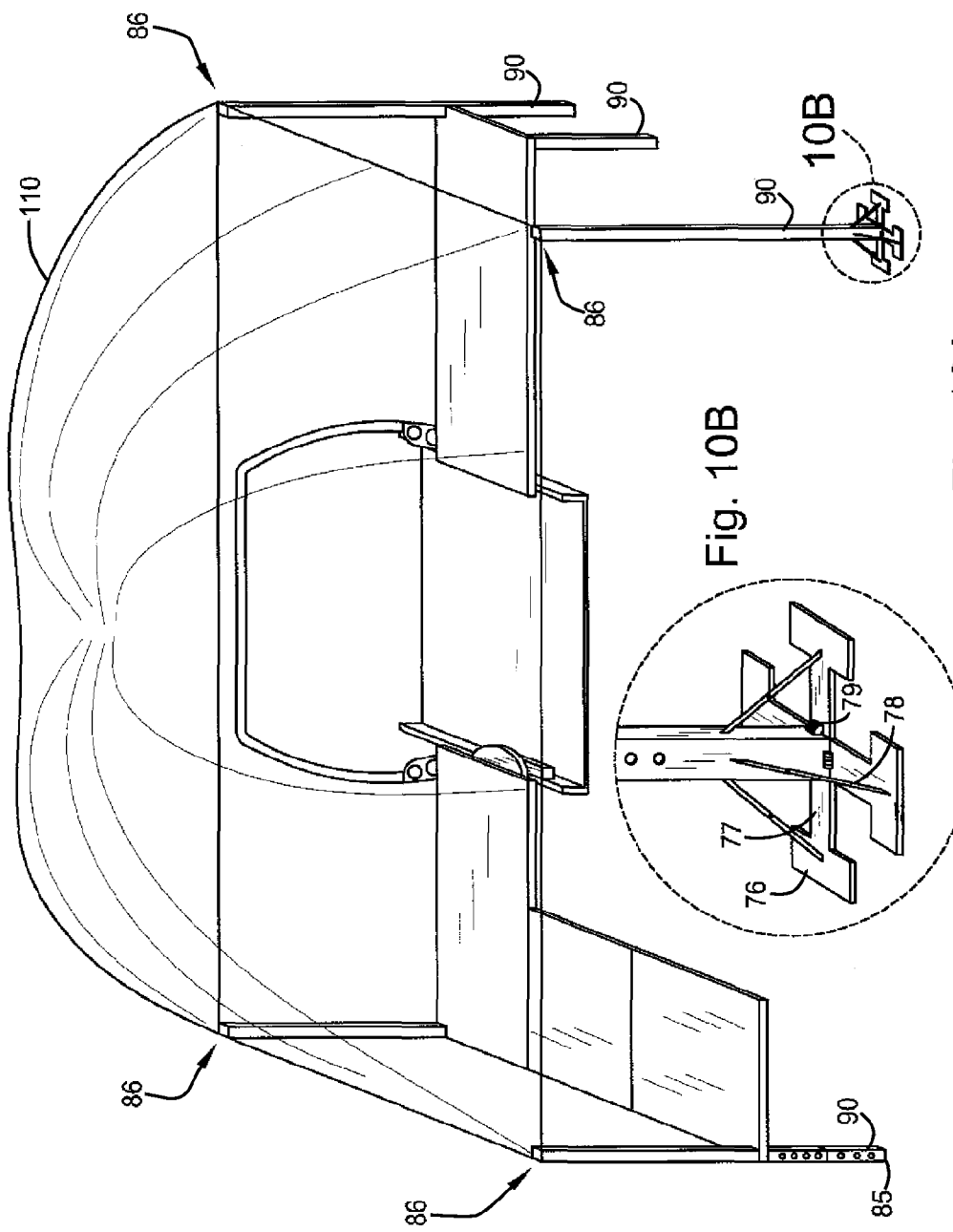
FIG. 10A is an isometric view of a driver-side and passenger-side platforms, the extension platform, the slider assembly, legs and a transparent canopy covering of one embodiment of the invention.
FIG. 10B is an isometric close-up view of a leg and coupled feet with brackets and hinges according to one embodiment of the invention.
Figure 16:
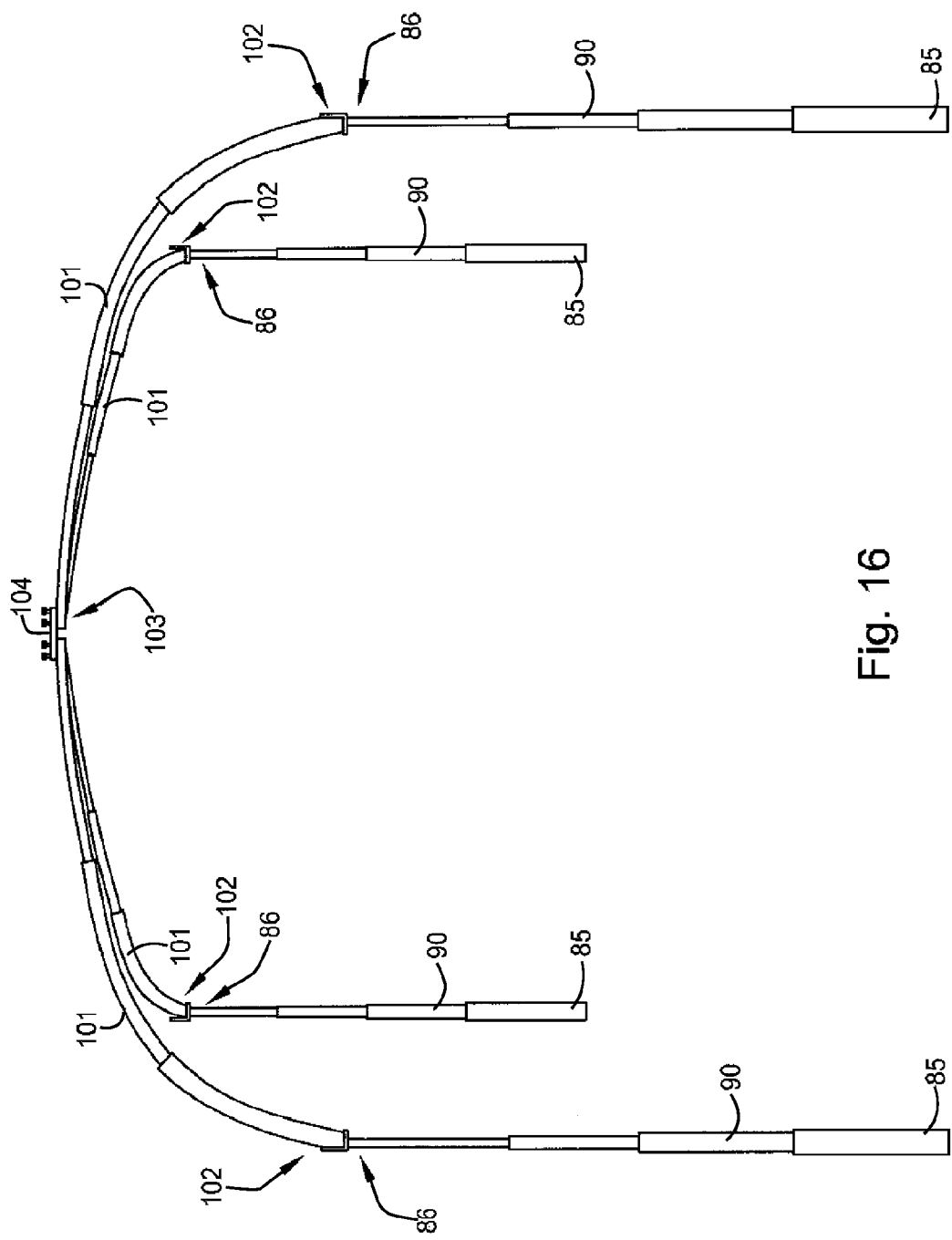
FIG. 16 is a side isometric view of telescoping legs and coupled canopy section framework of one embodiment of the invention.
Figure 17:
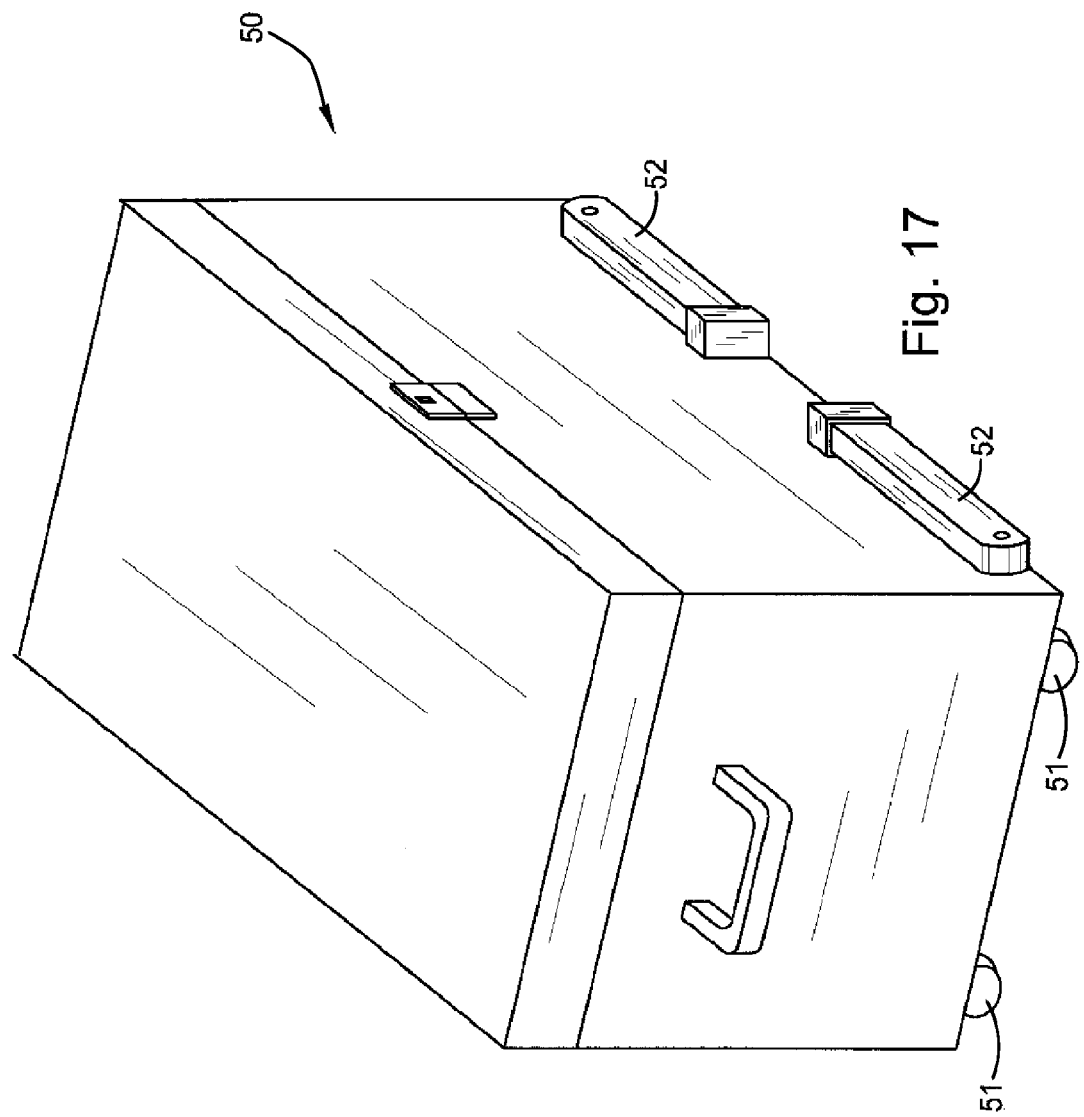
FIG. 17 is an isometric view of a cooling apparatus of one embodiment of the invention.

Besides the brackets 81, the extension platform 80 is supported by at least one leg 90, as best shown in FIG. 10A. There may be two legs coupled to the extension platform and one leg coupled to the driver-side platform in one embodiment, as best shown in FIG. 12. One extension platform leg may couple to a corner of the second section 83, as best shown in FIG. 10A. An embodiment may be comprised of a telescoping leg. FIG. 16 is the representation of 4 telescoping legs, each leg coupled to a corresponding telescoping canopy framework section 101. In one embodiment, the driver-side platform 30 has a leg coupled to a rear corner 35.

Figure 13:
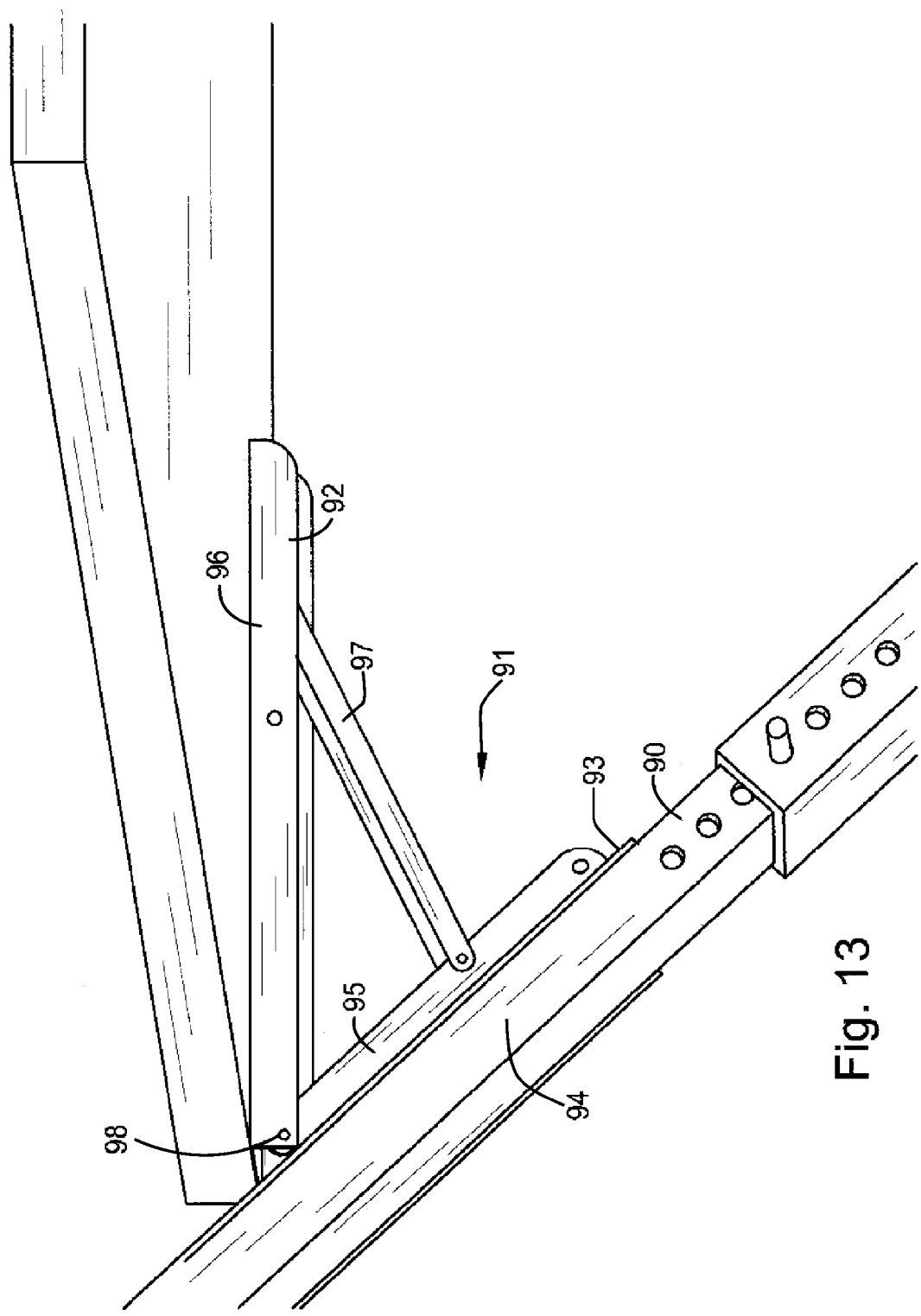
FIG. 13 is an isometric view of a hinge-bracket assembly and a portion of a coupled middle leg section and bottom leg section of one embodiment of the current invention.

In one embodiment, the legs 90 are coupled to the platform through a hinge-bracket assembly 91, as best shown in FIG. 13. The assembly is typically adapted to pivot the legs from a substantially vertical lengthwise position to a substantially horizontal lengthwise position. FIG. 13 shows how the leg is pivoted in one embodiment. One embodiment's hinge 92 is coupled to a bracket 93, which, in turn, is coupled to a middle section 94 of a leg.

The hinge 92 in one embodiment is comprised of a pivot section 95 and an anchored section 96. Upon placement of the driver-side platform in the horizontal orthogonal position and coupling of the extension platform to the driver-side platform, when the hinge pivot section is substantially parallel with the hinge anchor section, the leg middle section 94 is typically in a substantially horizontal position. The hinge pivot section is typically coupled to the hinge anchored section through a pin-bore pivot mechanism 98 and a brace 97. The brace may be adapted to lock in both the vertical position and the horizontal position in one embodiment. A pin-bore locking mechanism, or a latching mechanism may be used. Other locking mechanisms may be employed as well.

Figure 14:
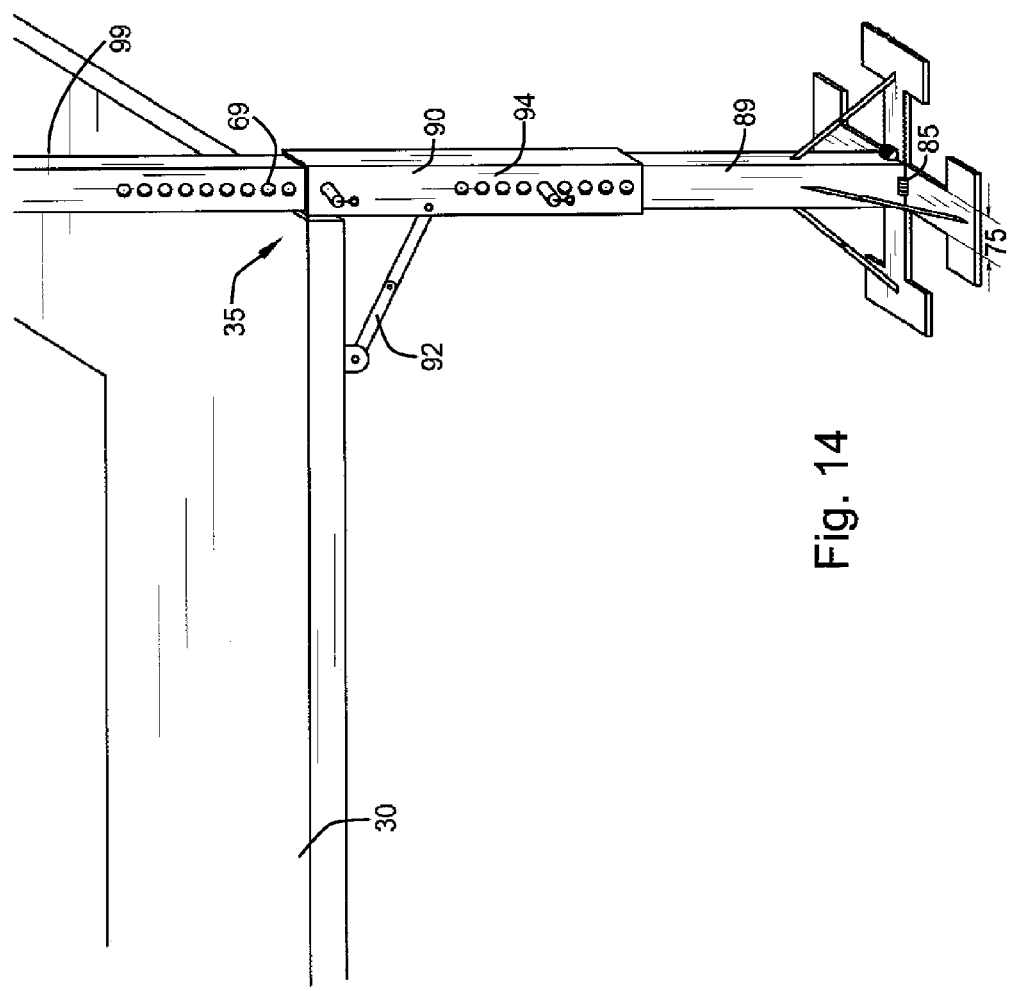
FIG. 14 is an isometric view of a portion of the extension platform, driver-side platform and a leg with coupled feet of one embodiment of the invention.
Figure 15:
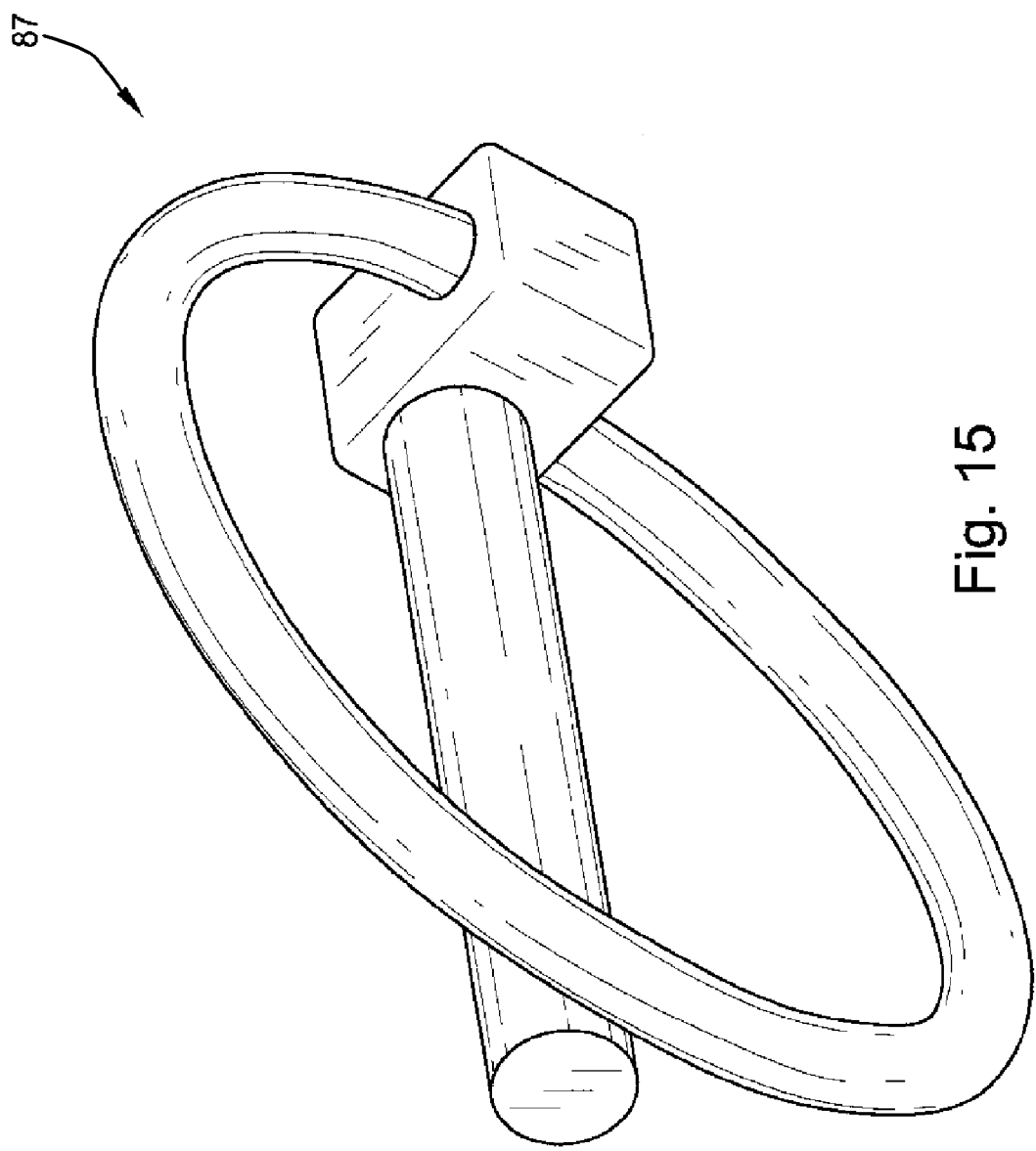
FIG. 15 is an isometric view of a pin of one embodiment of the invention.

One embodiment is comprised of a leg upper section 99, a leg middle section 94, and a leg lower section 89, as best shown in FIG. 14. The leg middle section may be coupled to the hinge-bracket assembly 91. Another leg section may be coupled to the hinge-bracket assembly in one embodiment. Also, in one embodiment, the upper and lower sections are coupled to the middle section in a telescoping manner. A telescoping embodiment may have additional leg sections as well. In the non-telescoping embodiment, the upper and lower sections are removably coupled to the middle section, as shown in FIG. 14.

In one non-telescoping leg 90 embodiment, the upper leg section 99 and lower leg section 89 are stored on the slider assembly 20 in a notch 25 adapted to substantially secure the legs during vehicle movement. The leg sections may also be stored on the slider assembly by being coupled to the driver-side platform 30, the passenger-side platform 40, or the extension platform 80 through at least one strap. Likewise, the extension table may be coupled to the slider assembly through a notch or through straps. Other mechanisms adapted to couple the legs and the extension table to the slider assembly are also contemplated, such as, but not limited to, being operatively coupled to the driver-side platform or passenger-side platform through a hinge. The middle leg section may also detachably couple to the hinge-bracket assembly 91 and may be stored on the slider assembly in substantially the same manner as the other leg sections.

In one embodiment, the leg sections are coupled together with a pin 87 inserted into a bore located in each leg section. The sections may be stored on the slider assembly 20 by coupling to a hinge-bracket assembly 91, or all the sections may be decoupled from the hinge-bracket assembly and stored in an alternative manner, such as, but no limited to, the strapping mechanism described above.

In one embodiment, as best shown in FIGS. 10A and 14, four feet 87 are coupled to the leg bottom section 89. A leg bottom section in one embodiment may also have less or more than four feet, such, but not limited to, an embodiment with two feet. Each foot is adapted to keep the leg 90 substantially stable. As a proximate end 86 of the leg in one embodiment is pivotably coupled to a canopy framework section 101, the feet are also adapted to keep the canopy assembly 70 substantially stable. In one embodiment, each foot is coupled to the distal end 85 of the bottom section with a hinge 79 and a brace 78, the brace adapted to lock in a down position, as best shown in FIG. 10A. A foot may also be adapted to lock in an up position.

In one embodiment, the foot 87 has a first section 77 and a second section 76. Each section is generally ½ an inch in thickness. The first section is also generally the same width 75 as the leg bottom section 89 and in one embodiment, the first section is 6 inches long. The second section in one embodiment is wider than the first section, the second section being about twice as wide as the first section, and integrated to the first section. The leg bottom section in one embodiment is 2 feet long, the leg middle section in one embodiment is also two feet long, and the leg upper section is 8 feet long. One embodiment may include more or less leg sections.

As best shown in FIG. 14, the leg sections are coupled together through a pin 87 inserted into a bore 69 in each leg. As best shown in FIG. 16, the legs 90 may also be telescoping legs. In either embodiment, a proximal end 86 of the leg is coupled to a proximal end 102 of a canopy framework section 101. One embodiment has arcuate canopy framework sections. Also, one embodiment does not have telescoping framework sections. A distal end 103 of the canopy framework section is rotatably coupled to a plate 104. The plate and canopy framework section may be coupled with a bolted assembly. An embodiment may include a different coupling mechanism as well.

Coupled to the canopy framework section is a covering. The covering in one embodiment is a flexible sheet material, such as, but not limited to, a tarp. The covering may be coupled to the framework by inserting the framework through loops in the covering. The canopy framework may also be coupled to the covering with a hook-loop coupling mechanism or any other coupling mechanism such as, but not limited to, a series of snaps or latches.

The canopy assembly in one embodiment has 4 sides, as best shown in FIG. 18. Each side is coupled to an edge of the canopy covering. One side has an opening for the rear portion of a vehicle to fit within. Two sides in one embodiment do not have openings, and a side opposite the vehicle opening side has an opening which allows person to enter and exit the canopy assembly. The top 105 of the canopy covering in one embodiment includes at least one flap which is adapted to allow wind to enter and exit the canopy without blowing the canopy covering off the canopy framework.

An embodiment also includes a passenger-side platform and a cooling apparatus. The passenger-side platform operates in substantially the same manner as the driver-side platform. For example, the passenger-side platform is operatively coupled to a turntable and sliding piece. However, the passenger-side platform dies not rotate and hinge from a storage position which is generally parallel the vehicle's longitudinal axis to a position which is proximal the driver-side position of the vehicle, like the driver-side platform, but the passenger-side platform rotates and hinges to a position proximal the passenger-side position oldie vehicle. The passenger-side platform may also couple to an extension platform. The extension platform is typically substantially similar to the extension platform described earlier.

Other Embodiments and Variations

The embodiments of the vehicle table system as illustrated in the accompanying figures and described above are merely exemplary and are not meant to limit the scope of the invention. It is to be appreciated that numerous variations to the invention have been contemplated as would be obvious to one of ordinary skill in the art with the benefit of this disclosure.

For example, as described briefly herein, it is contemplated that the system works not only with a minivan, but is adapted to couple to the bed of a pick-up truck, a trunk of a car, the rear cargo area of an SUV, or to couple to an RV. With any of these units, and in particular a Toyota Highlander SUV unit, the unit may replace the storage frame 10 with a cable-ratchet system that is adapted to couple to the D-Rings located in the rear cargo area of an SUV.

Additionally, it is contemplated to have an electronic system such that the embodiment is capable of at least partially expanding upon engagement of an electronic circuit.

I claim:

1. An assembly for mounting to a cargo area of a vehicle, comprising:
    a framework adapted to attach to the cargo area of the vehicle by way of one or more attachment brackets, an upper section of the framework being adapted to slide relative to a lower section of the framework whereby the upper section can be slid at least partially out of a the cargo area of the vehicle while the lower section remains attached to the vehicle;
    a first foldable platform coupled to the upper section, the first foldable platform adapted to extend outwardly of the upper section of the framework and the vehicle when the upper section has been slid at least partially out of the vehicle, wherein a first support leg is adapted for attachment to the first foldable platform;
    a second foldable platform coupled to the upper section, the second foldable platform adapted to extend outwardly of the upper section of the framework and the vehicle when the upper section has been slid at least partially out of the vehicle, the second foldable platform adapted to fold out in an opposite direction of a direction of the first foldable platform, wherein a second support leg is adapted for attachment to the second foldable platform;
    the framework locatable in a stowed position wherein the upper section of the framework is fully inserted into the cargo area, wherein a flat bottom of the upper section provides a floor for storage;
    said flat bottom of the upper section having wheels to enable the flat bottom to slide in and out of the cargo area;
    said flat bottom further comprising a longitudinal sidewall which supports a turntable assembly;
    said turntable assembly having a first pivotable table which is stored in a vertical orientation in the stowed position, and having a slide so the first pivotable table can slide out and pivot to a horizontal orientation;
    the framework locatable in a deployed position, wherein in the deployed position a pivotable table extension is adapted to extend rearward from the first foldable platform, and wherein a third support leg is adapted for attachment to the pivotable table extension; and
    a canopy locatable in a canopy deployed position wherein a canopy framework assembly and a flexible covering are supported by the first, second and third support legs together with a fourth support leg.

2. The assembly of claim 1, wherein the canopy framework assembly further comprises a central top plate having a rotatable connection to a first, a second, a third and a fourth canopy framework section which are supported by one of the first, second, third and fourth support legs.

3. The assembly of claim 1, wherein each of the support legs further comprises telescoping tubes.

4. The assembly of claim 1, wherein the canopy assembly further comprises a plurality of panels, each panel comprised of flexible sheet material adapted to attach to the canopy assembly to form vertically disposed sides.

* * * * *

UNITED STATES PATENT AND TRADEMARK OFFICE
CERTIFICATE OF CORRECTION

| | | |
|---|---|---|
| PATENT NO. | : 8,256,818 B1 | Page 1 of 1 |
| APPLICATION NO. | : 12/868227 | |
| DATED | : September 4, 2012 | |
| INVENTOR(S) | : Ernest P. Tovani | |

It is certified that error appears in the above-identified patent and that said Letters Patent is hereby corrected as shown below:

Claim 1, Column 12, Line 14, the portion of the claim reading "at least partially out of a time" should read: --at least partially out of the--.

Signed and Sealed this
Twenty-third Day of October, 2012

David J. Kappos
*Director of the United States Patent and Trademark Office*